(12) United States Patent
Christiaens et al.

(10) Patent No.: US 6,418,717 B1
(45) Date of Patent: Jul. 16, 2002

(54) HYDRAULIC CYLINDERS

(75) Inventors: Yannick Frank Theophile Emile Christiaens, Chanteau; Loic Jean Bernard Bouyer, Paris; Patrick Desbois, Olivet, all of (FR)

(73) Assignee: Automotive Products France, SA, Chevilly (FR)

( * ) Notice: Subject to any disclaimer, the term of this patent is extended or adjusted under 35 U.S.C. 154(b) by 0 days.

(21) Appl. No.: 09/762,361

(22) PCT Filed: Jun. 5, 2000

(86) PCT No.: PCT/EP00/05087

§ 371 (c)(1),
(2), (4) Date: Feb. 5, 2001

(87) PCT Pub. No.: WO00/77415

PCT Pub. Date: Dec. 21, 2000

(30) Foreign Application Priority Data

Jun. 10, 1999 (GB) .............................. 9913383

(51) Int. Cl.$^7$ ................................. F15B 7/08
(52) U.S. Cl. ....................................... 60/588
(58) Field of Search .......................... 60/588

(56) References Cited

U.S. PATENT DOCUMENTS 5,046,316 A * 9/1991 Steffes et al. ................. 60/588
5,970,711 A * 10/1999 Kaneko et al. ................ 60/588

FOREIGN PATENT DOCUMENTS

GB 541151 * 11/1941 ................. 60/588

* cited by examiner

Primary Examiner—F. Daniel Lopez
(74) Attorney, Agent, or Firm—Paul E Milliken; Ray L Weber

(57) ABSTRACT

A hydraulic cylinder has a piston (13) with a seal (21) in sealed sliding contact within a bore (12) to define a working chamber (16) ahead of the piston for the discharge of pressurised fluid from the bore via an outlet (17) when the piston is undertaking working stroke, an inlet (20) is provided into the bore from an associated reservoir to allow connection between the reservoir and the working chamber when the piston is in a fully retracted state for recuperation of fluid from the reservoir to the working chamber. The connection between the reservoir and working chamber is provided via a sleeve (27) in the bore (12) winch includes axially extending grooves (28), the grooves being closed by the piston seal (21) during a working stroke of the cylinder but the ends (30) of the grooves being open when the piston (13) is in a fully retracted condition within the sleeve thus by-passing the piston sleeve to connect the working chamber and reservoir. The sleeve (27) may also have a secondary function of providing an abutment (31) for a return spring (32) which returns the piston to its fully retracted position when an operating pedal (14) associated with the piston (13) is released.

5 Claims, 2 Drawing Sheets

HYDRAULIC CYLINDERS

This invention relates to hydraulic cylinders and in particular to hydraulic master cylinders used, for example, to operate vehicle clutches.

Such a cylinder, hereinafter referred to as of the type specified, comprises a piston with a seal in sealed sliding contact within a bore to define a working chamber ahead of the piston for the discharge of pressurised fluid from the bore via an outlet when the piston is undertaking a working stroke, an inlet is provided into the bore from an associated reservoir to allow connection between the reservoir and the working chamber when the piston is in a fully retracted state for recouperation of fluid from the reservoir to the working chamber.

Many arrangements have been provided for allowing such recouperation and it is an object of the present invention to provide a simple and low cost construction for recouperation.

Thus according to the present invention there is provided a hydraulic cylinder of the type specified in which the connection between the reservoir and working chamber is provided via a sleeve in the bore which includes anally extending grooves, said grooves being closed by the piston seal during a working stroke of the cylinder but the ends of the grooves being open when the piston is in a fully retracted condition within the sleeve thus by-passing the piston sleeve to connect the working chamber and reservoir.

The arrangement of the present invention is particularly suitable for clutch master cylinders in which the master cylinder body is manufactured from plastics material and the sleeve is also of plastics material.

The sleeve may also have a secondary function of providing an abutment for a return spring which returns the piston to its fully retracted position when an operating pedal associated with the piston is released.

One embodiment of the present invention will now be described, by way of example only, with reference to the accompanying drawings in which.

Figure 1:
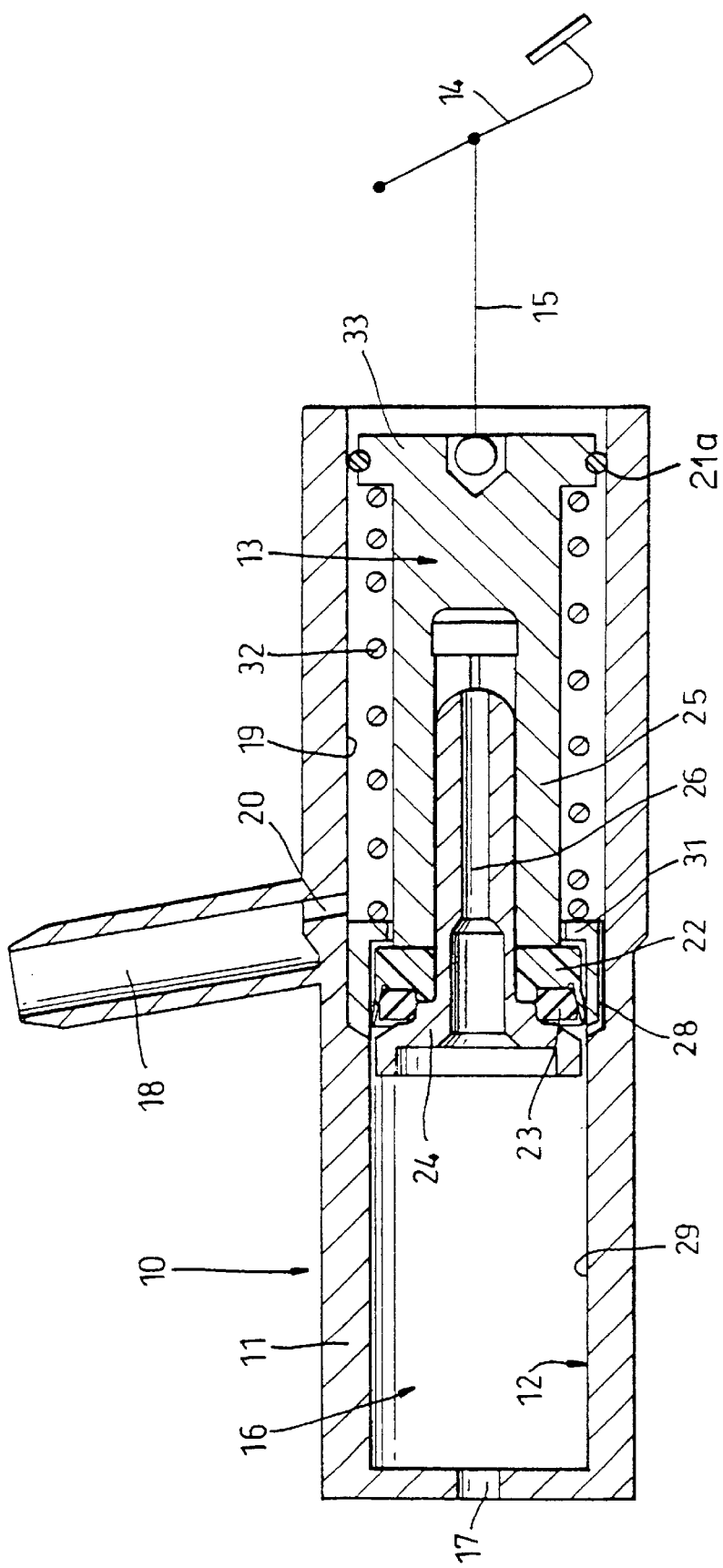
FIG. 1 shows, partially diagramatically, in section a master cylinder embodying the present invention.

Referring to the drawings a hydraulic master cylinder 10 for use in the operation of a vehicle clutch comprises a body 11 having a bore 12 in which a piston 13 is in sealed sliding contact. Piston 13 is connected with an associated clutch pedal 14 as shown diagramatically by the connection 15 and ahead of the piston 13 a working chamber 16 is provided with an outlet 17 connected via conduit (not shown) with a clutch operating slave cylinder.

The master cylinder also has an inlet 18 which is connected with a fluid reservoir (not shown) and also a larger diameter portion 19 of bore 12 via a passage 20. Piston 13 carries a main seal 21 which is of plastics material being an integral part of an annular component 22. The plastics main seal 21 is energised against bore 12 by an elastomeric (e.g. rubber) annulus 23 which ensures that the seal 21 remains in contact with the associated bore etc. This sealing arrangement is the subject of the Applicant's co-pending European Patent Application No. EP 0894687 A1. A normal separate rubber secondary seal can alternatively be used to seal piston 13 to bore the larger diameter portion 19 of the 12.

The component 22 and rubber annulus 23 are held in place on the remainder of the piston by a central member 24 which is pressed into, welded or otherwise secured to the main body 25 of the piston 13. In the construction shown the central member 24 has an axial bore 26 which is provided for manufacturing reasons (to reduce shrinkage) since the central member 24 is produced by an injection moulding technique from plastics material. The central member may alternatively, for example, be of a shorter construction which may not necessarily include the shrinkage bore 26.

In a preferred arrangement both the body 11 and piston 13 etc. are all formed from plastics material by injection moulding techniques.

In accordance with the present invention an annular sleeve 27 is provided in the larger diameter portion 19 of bore 12. Sleeve 27 includes axially extending grooves 28 which in combination with bore portion 19 define passages which emerge into the smaller diameter portion 29 via openings 30. Sleeve 27 also includes an annular shoulder 31 against which a return spring 32 reacts. The other end of spring 32 reacts against a shoulder 33 provided on piston 13 to ensure that the piston always returns to the fully retracted position shown in FIGS. 1 and 2 in the associated pedal for its release.

Figure 2:
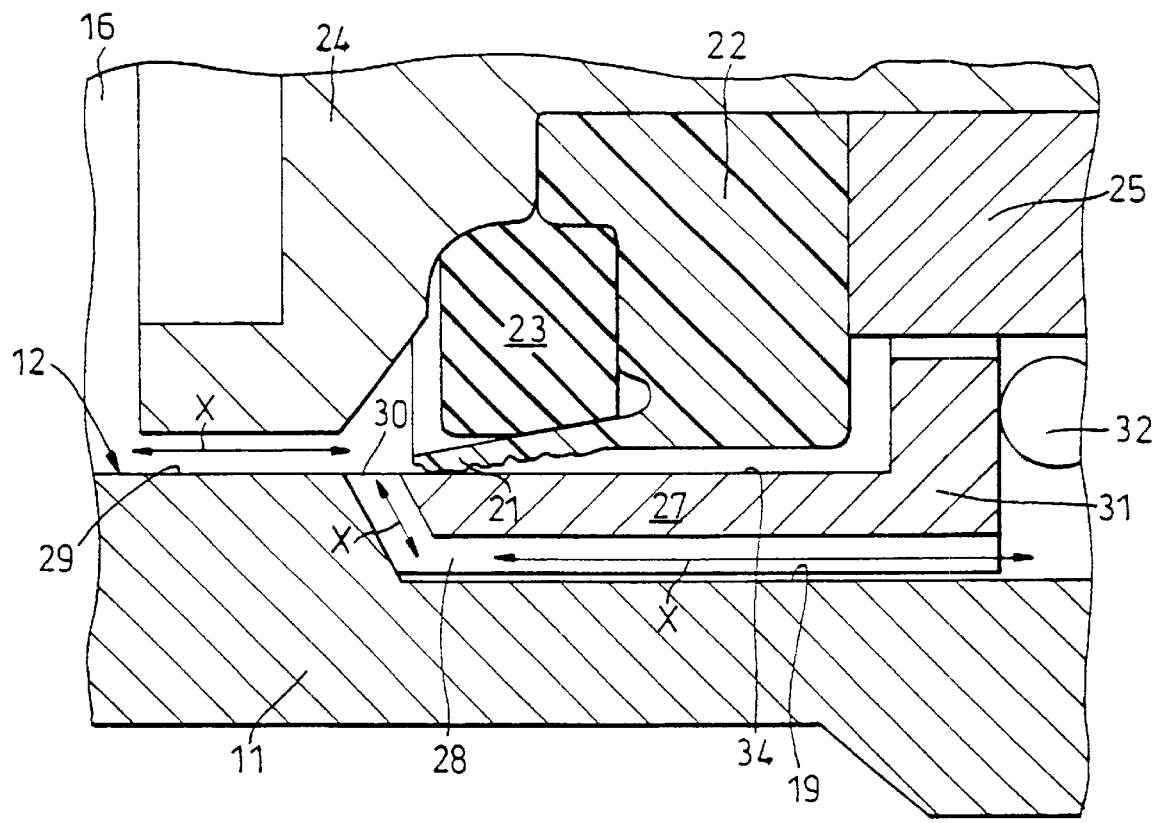
FIG. 2 shows part of the cylinder of FIG. 1 on a larger scale.
Figure 3:
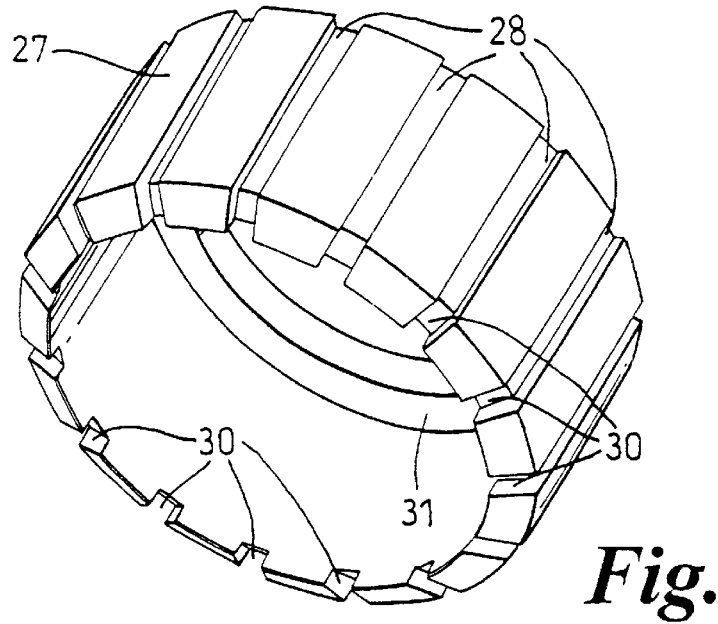
FIG. 3 shows a perspective view of a recouperation sleeve used in the cylinder of FIGS. 1 and 2.

As can be seen from FIGS. 1 and 2 when the piston is in the fully retracted position the main seal 21 is in contact with the internal diameter 34 of sleeve 21 and the openings 30 in the sleeve are no longer sealed allowing communication between the inlet 18 and the working chamber 16 via passage 20 and grooves 28 (see arrows X). Thus in the fully retracted position of the piston the reservoir connected with inlet 18 is in communication with working chamber 16 allowing recouperation of fluid into the working chamber 16 to take account any increase in working stroke of the piston necessary due to the wear of the associated clutch or any leakage of fluid from the working chamber.

When pedal 14 is pushed piston 13 is moved to the left from its fully retracted position shown in FIGS. 1 and 2 so that main piston seal 21 moves to the left of openings 30 to cut-off flow through grooves 28 and allow pressurisation of working chamber 16 in the normal manner.

The recouperation arrangement of the present invention is not only simple to manufacture but has the additional benefit that when in the flilly retracted position the main seal 21 is in contact with the smooth internal diameter 34 of the sleeve 27 so that the seal is not damaged. Also by the use of a relatively large number of grooves 28 a quick recouperation function can be achieved each time the piston goes to the fully retracted position thus reducing any dead travel in the operating stroke of the piston.

As will be appreciated it is considerably easier to produce the grooves 28 in the sleeve 27 than to try to mould these in the master cylinder body itself.

Additionally the sleeve 27 provides an abutment for the return spring 32.

What is claimed is:

1. A hydraulic cylinder comprising a piston with a main seal in sealed sliding contact within a small diameter portion of a bore in a housing to define a working chamber ahead of the piston for the discharge of pressurized fluid from the bore via a outlet when the piston is undertaking a working stroke, an inlet into a larger diameter portion of the bore from an associated reservoir, a sleeve in the larger diameter portion of the bore, the sleeve including axially extending grooves which allow fluid flow between the reservoir inlet and working chamber, said flow between the reservoir inlet and working chamber being closed by the main piston seal during a working stroke of the cylinder, flow through the grooves between the reservoir inlet and working chamber being open for recuperation of fluid from the reservoir to the working chamber when the piston is in a fully retracted condition with its main seal within the sleeve, the piston also carrying a secondary seal which is in sealed sliding contact with the larger diameter portion of the bore to seal the bore against all egress of fluid.

2. A hydraulic cylinder according to claim 1 characterized in that the grooves are formed in the outer peripheral surface of the sleeve and one end of the sleeve abuts a shoulder between the smaller and larger diameter portions of the bore and is provided with generally radially extending openings through which the grooves open into the bore.

3. A hydraulic cylinder according to claim 2 characterized in that the sleeve is held against the shoulder by a return spring which returns the piston to its fully retracted position when an operating pedal associated with the piston is released.

4. A hydraulic cylinder according to claim 1 characterized in that the sleeve is manufactured from plastics material.

5. A hydraulic cylinder according to claim 1 characterized in that the main seal is of plastics material and comprises and annular lip formed integrally with an annular body part of the piston and which in energized against the bore by elastomeric material.

* * * * *